US008742908B2

(12) United States Patent
Boudy

(10) Patent No.: US 8,742,908 B2
(45) Date of Patent: Jun. 3, 2014

(54) LOCATION-BASED TRACKING

(75) Inventor: Cedric Boudy, Lisieux (FR)

(73) Assignee: NXP, B.V., Eindhoven (NL)

( * ) Notice: Subject to any disclaimer, the term of this patent is extended or adjusted under 35 U.S.C. 154(b) by 6 days.

(21) Appl. No.: 13/539,787

(22) Filed: Jul. 2, 2012

(65) Prior Publication Data

US 2013/0021145 A1 Jan. 24, 2013

(30) Foreign Application Priority Data

Jul. 21, 2011 (EP) .................................... 11290334

(51) Int. Cl.
*B60R 25/10* (2013.01)
*G08B 21/00* (2006.01)

(52) U.S. Cl.
USPC .............. 340/426.11; 340/426.1; 340/539.13; 340/572.1; 340/686.6; 340/568.1

(58) Field of Classification Search
USPC ............... 340/426.1, 426.11, 426.13, 426.36, 340/426.19, 425.5, 539.13, 572.1, 573.1, 340/686.6, 988, 5.92, 5.74, 10.1, 539.14, 340/568.1, 539.1; 307/10.2, 10.5
See application file for complete search history.

(56) References Cited

U.S. PATENT DOCUMENTS

| | | | | |
|---|---|---|---|---|
| 5,515,419 | A * | 5/1996 | Sheffer | 455/456.5 |
| 5,684,454 | A * | 11/1997 | Nishioka et al. | 340/426.12 |
| 5,874,889 | A * | 2/1999 | Higdon et al. | 340/426.36 |
| 7,126,940 | B2 | 10/2006 | Vanttinen et al. | |
| 7,550,869 | B2 * | 6/2009 | Higuchi et al. | 307/10.5 |
| 7,598,855 | B2 | 10/2009 | Scalisi et al. | |
| 2003/0095032 | A1 | 5/2003 | Hoshino et al. | |
| 2007/0032224 | A1 | 2/2007 | Boyer et al. | |
| 2007/0273489 | A1 * | 11/2007 | Tauchi et al. | 340/426.11 |
| 2008/0303636 | A1 | 12/2008 | Chatte et al. | |
| 2008/0316042 | A1 | 12/2008 | Scales | |

FOREIGN PATENT DOCUMENTS

| | | | |
|---|---|---|---|
| CN | 1471796 | A | 1/2004 |
| CN | 101517432 | A | 8/2009 |
| EP | 1 950 694 | A2 | 7/2008 |

OTHER PUBLICATIONS

NXP Brochure, "Automotive Telematics On-board unit Platform (ATOP)," 2 pgs. (2010).
Extended European Search Report for European patent appln. No. 11290334.9 (Nov. 30, 2011).
Office Action from counterpart application CN102891705 (Mar. 19, 2014).

* cited by examiner

*Primary Examiner* — Anh V La

(57) ABSTRACT

Object tracking is facilitated. In accordance with one or more embodiments, an object tracking apparatus (200) includes a proximate-range circuit (212), a positioning circuit (214) and a communications circuit (216). The proximate-range circuit wirelessly verifies the identity and presence of at least one proximate-range communications device (220), and the positioning circuit determines positioning information of the object tracking apparatus. The communications circuit receives outputs from the proximate-range circuit and positioning circuit respectively regarding the verification and positioning information, and wirelessly communicates data to a remote communications station based upon the received outputs (140).

15 Claims, 3 Drawing Sheets

LOCATION-BASED TRACKING

CROSS-REFERENCE TO RELATED APPLICATIONS

This application claims the priority under 35 U.S.C. §119 of European patent application no. 11290334.9, filed on Jul. 21, 2011, the contents of which are incorporated by reference herein.

The identification and/or tracking of objects have been important for a variety of applications, such as for tracking vehicles, objects such as art objects, animals and people, and for ensuring the location and safety of valuable objects. Global positioning systems, radio frequency systems and others have been used for a variety of tracking purposes.

While various systems have been amenable to implementation with various tracking approaches, issues can arise with these approaches that may diminish or remove the ability to track objects. For example, localization devices can be retired or moved from the object to another, thus sending a false position to the user. In addition, where radio-frequency identification (RFID) tags are used for identification, the tag can be removed or hacked.

These and other issues continue to present challenges to identification and/or location-based tracking.

Various example embodiments are directed to tracking the location of objects, and to addressing various challenges including those discussed above.

According to an example embodiment, an object tracking apparatus includes a proximate-range circuit, a position-assessment circuit and a communications circuit. The proximate-range circuit wirelessly communicates with at least one proximate-range communications device to verify the identification and presence thereof, and provides an output indicative of the identity and presence of the at least one proximate-range communications device. The position-assessment circuit assesses the position information of the object tracking apparatus using received wireless communications, and provides an output indicative of the position information. The communications circuit receives the outputs from the proximate-range circuit and the position-assessment circuit, and wirelessly communicates data including the position information via a distal-range communications station based upon the received outputs.

Another example embodiment is directed to a system for tracking an object. The system includes a proximate-range communications tag and an object-tracking device. The proximate-range communications tag responds to proximate-range wireless communications by wirelessly communicating identification information. The object-tracking device wirelessly communicates with the tag to verify the identity and presence of the tag, and determines a geographical position of the object-tracking device using received wireless communications. The object-tracking device further wirelessly communicates data, indicative of the determined geographical position to a distal-range communications station, based on the verification of the identity and presence of the tag.

Another example embodiment is directed to a method for tracking an object. Wireless communications are effected with at least one proximate-range communications device to verify the identity and presence of the at least one proximate-range communications device, and an output indicative of the presence of the at least one proximate-range communications device is provided. Geographical positioning information is determined using received wireless communications, and an output indicative of the determined positioning information is provided. Data, including the determined positioning information, is wirelessly communicated via a distal-range communications station, based upon the provided outputs.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

Figure 1:
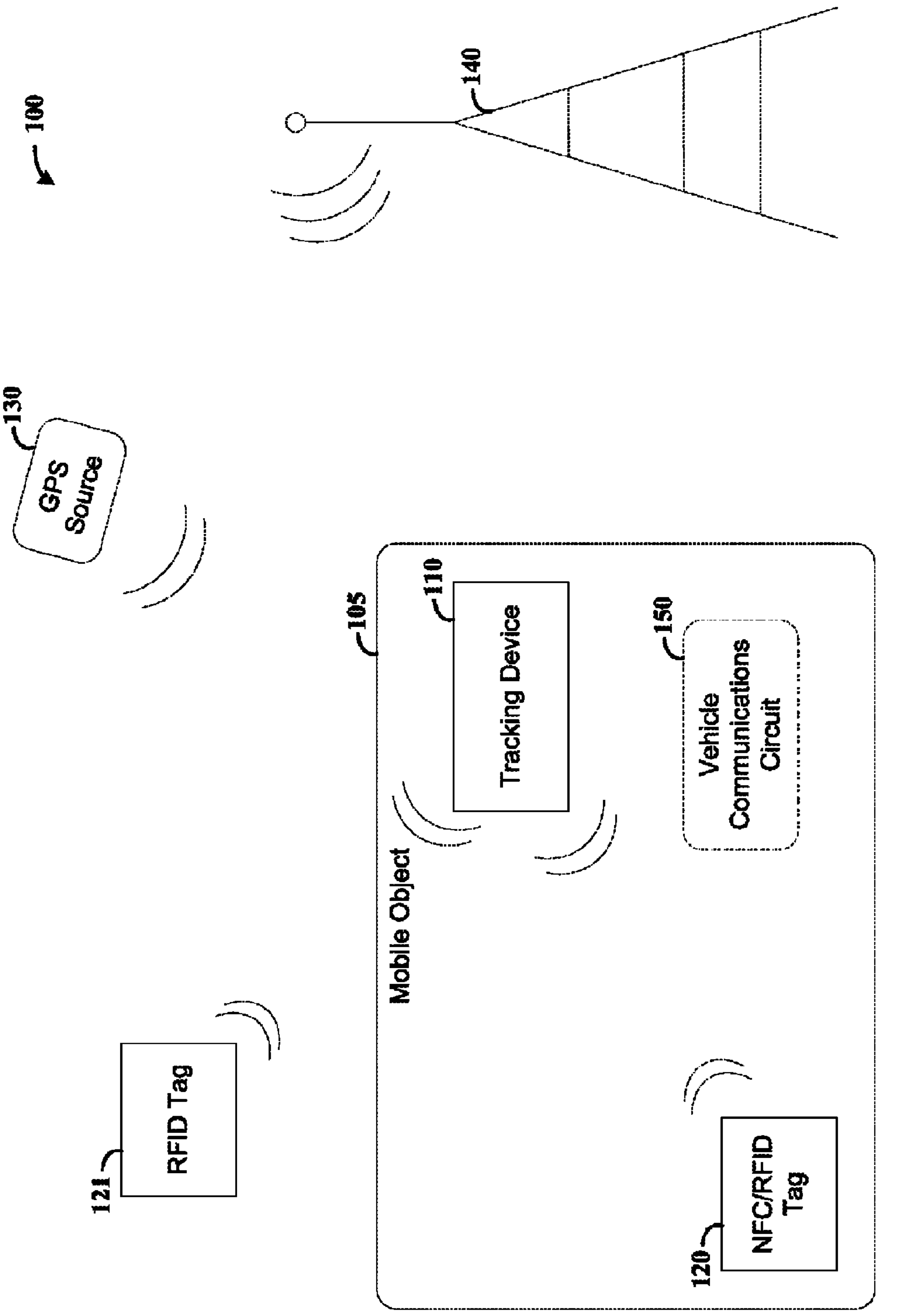
FIG. 1 shows a location-based tracking device and system, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of circuits, devices and systems for location-based object tracking. While the present invention is not necessarily limited in this context, various aspects of the invention may be appreciated through a discussion of related examples.

In according with various example embodiments, an object tracking device operates to communicate with both an identification circuit and a wireless location-based communications system, and to use the communications in verifying a position and/or tracking of an object. In some implementations, the object tracking device implements and/or interacts with location based services, wireless radio communications, and proximate-range wireless communications (e.g., near field communications (NFC) or radio frequency identification (RFID) communications) for tracking objects with both positioning and proximate-range verification with respect to an identification circuit.

Using approaches as described herein, a variety of tracking-type functions can be achieved, including those involving one or more of: monitoring an object's position and ensuring that an authenticated object stays in an authorized area; verification of an object's identification with a proximate-range device; tracking of a current position by wireless radio communication; and storage of information related to the identified object. These aspects can be realized by implementing both identification (e.g., via an NFC or RFID tag) and communication (e.g., via wireless radio) together for a tracked/identified object.

In a more particular example embodiment, a proximate-range tag and an object tracking device are implemented together, with the object tracking device determining both its location and its proximity relative to the proximate-range tag, which can also be used to authenticate an object bearing the proximate-range tag. At least one of the proximate-range tag and the object tracking device is located on an object to be tracked. The object tracking device identifies its own location (or provides information for doing so), verifies proximity of the proximate-range tag, and communicates this location and proximity information for tracking (e.g., over a radio frequency network). The proximate-range tag proximity verification can be carried out as a cyclic or ongoing process to detect changes in one or both of the proximate-range tag and object tracking device. For example, if the proximate-range tag cannot be verified, the object tracking device can report an alert (e.g., if the object tracking device has been removed from a vehicle on which both the object tracking device and proximate-range tag are located, the tracking device can generate an alert indicative of a theft). More than one proximate-range tag can also be used to suit various applications.

The location of the proximate-range tag can be remote to the object tracking device, which permits the secure placement of the tag (e.g., in a portion of a vehicle that is difficult to access). In some implementations, the object tracking device is located on the object to be tracked, and at least one remote proximate-range tag is located remotely from the object to be tracked. For example, a remote proximate-range tag may be placed in a vehicle's parking area, sufficiently near the vehicle to facilitate proximate-range communications between the object tracking device and the remote proximate-range tag. If the vehicle is moved away from the parking area, the object tracking device loses contact with the remote proximate-range tag. This loss of contact can be reported, such as to an owner via an RF communications link, to alert the owner that the vehicle has been moved away from the parking area.

Two or more proximate-range tags including a local and remote proximate-range tag may be used together with a single object tracking device. The local proximate-range tag (e.g., an NFC or RFID tag) is located on an object with the object tracking device, and the remote proximate-range tag (e.g., an RFID tag) is located remote from the object (e.g., in a vehicle garage). The remote proximate-range tag is located in sufficient proximity to the object (e.g., sufficiently near a vehicle's normal parking position) to permit communications between the remote proximate-range tag and the object tracking device. Using this approach with a vehicle, proximity verification of the local and remote proximate-range tags (e.g., in both a garage and on a vehicle) can be used to mitigate theft of the vehicle.

In some embodiments, the object tracking device includes a real-time location device, such as a global positioning system (GPS) device, a proximate-range communications circuit and a distal-range wireless communication module such as a wireless telephony module (e.g., employing Global System for Mobile communications (GSM)). The wireless communication module is used to transmit data and/or send alerts in real-time, with information corresponding to positioning determined via the real-time location device, and proximity determined via the proximate-range communications circuit.

Various embodiments as described herein may be implemented using one or more of a variety of approaches, devices, systems and communications methods. For example, mobile object tracker devices such as the ATOP (OM12000: Automotive Telematics Onboard Platform) available from NXP Semiconductors of Eindhoven, the Netherlands, may be implemented with a variety of embodiments (see, e.g., NXP publication "NXP Automotive Telematics On-board unit Platform (ATOP), June, 2010, which is fully incorporated herein by reference). Such implementations may employ GPS, GSM/GPRS mobile communications, and device and vehicle connectivity via high speed communications such as via a CAN bus, USB 2.0 communications and NFC.

In certain embodiments, additional information is stored in an object tracking device/system using a proximate-range tag that is specific to a particular object. For example, where the object is animal, dedicated information regarding vaccine dates and other information can be stored accordingly. Where implemented with a vehicle, maintenance history, location history, speed history and other information can be stored and used in association with the particular RFID tag information for that vehicle. In addition, via the proximate-range tag identification, the resulting object to which information is communicated can be verified for security.

Communications from the object tracking device regarding an indication of identification, location or other condition are carried out in accordance with a variety of approaches, to suit particular applications. For example, when an object is detected as being moved from a predefined zone, an alert can be sent to a user. Such an approach may involve, for example, detecting a position change via a GPS device or wireless circuit (e.g., via mobile telephone base stations), or detecting a position change between a remote RFID tag and an object tracking device on the object.

As another example, theft is detected under various conditions. If an object tracking device is removed by a thief, as soon as the thief moves the object out of proximate (e.g., NFC or RFID) range of the object tracking device, an alert is generated. This alert may, for example, involve communications over a wireless link such as a GSM/GPRS link. A local alert may also be initiated, such as by sounding an alarm or generating a local signal (e.g., via a CAN bus) that disables a vehicle (with the vehicle being the tracked object) in response to failing proximate-range communications between a tag and the object tracking device.

In accordance with other example embodiments, wireless communications between the object tracking device and a wireless system are monitored to detect interruption therein. For example, if a thief uses a GSM jammer to interfere with communications, a response can be carried out in a variety of manners. For example, if a network register for the object tracking device is lost (e.g., using a timeout tracking approach with a server register), this loss can be detected and used to generate and provide an alert to a user. As another example, if the object tracking device detects loss of wireless connection, the device may generate a local response at the object, such as by sounding an alert or disabling a vehicle (when the object is a vehicle).

In a more particular example embodiments, one or both of an object tracking device and an RFID device is configured for user deactivation, which may be effected using a user code. For example, if a user wishes to remove a device (e.g., to terminate remote RFID proximity, or to remove a tracking device), the user may access the object tracking device to remove the device(s) without triggering an alert. This access may involve, for example, user entry of an access code, or NFC authentication via a personal tag/card.

In another particular embodiment, location-based tracking of an object is selectively carried out using both a proximate-range and a distal-range wireless tracking approach such as a GPS or GSM/GPRS type approach. When the object is within a particular area or zone as identified via NFC and/or RFID communications, GPS or GSM/GPRS type tracking is disabled as the location of the object is known via the NFC and/or RFID communications. When the object leaves the zone (e.g., when an automobile is driven away from its garage), distal-range wireless tracking is initiated. Similarly, communications regarding the tracking (e.g., via a wireless telephone system) can be selectively implemented based upon the removal of an object from such a zone as may be detected, for example, via loss of RFID communications therein. Alerts may also be sent to notify a user of such tracking changes, which can be implemented to alert a user when an object has been removed from and returned to a zone.

In certain embodiments, an alternate power device is coupled to the object tracking device in order to provide power when power is removed therefrom (e.g., if a thief disables power to the device). The alternate power device may, for example, include a kinetic charger device (e.g., that uses movement of a vehicle as it is being stolen), or a battery and solar cell that reloads the battery.

In the context of various embodiments, the term proximate-range is used in connection with communications, circuits, devices and systems. As discussed above, such proximate-range communications may include NFC with tags or cards, with high-frequency communications limited to a few centimeters. Such proximate-range communications can also be carried out with RFID tags, which can be tailored to extend to several meters in communications range. Communications that are not proximate-range communications include those such as GSM communications (e.g., for communicating with a GSM tower over several hundred meters, or over several kilometers), and Wi-Fi communications (e.g., in accordance with the IEEE 802.11 standard) ranging 20 meters or more. Moreover, as discussed herein, various embodiments exemplified with implementation of NFC communications may be implemented with RFID communications, and those exemplified with RFID communications may be implemented with NFC communications. Other proximate-range communications (e.g., in the range of a few centimeters to a few meters), such as communications based on the Bluetooth standard, may also be implemented in connection with various embodiments.

Turning now to the figures, FIG. 1 shows a location-based tracking device and system 100, in accordance with an example embodiment of the present invention. The system 100 shows various components, which may be implemented separately or in conjunction with one another. Accordingly, various embodiments are directed to devices and/or systems employing one or more aspects as shown in FIG. 1, as part of or all of the system 100.

A movable object 105 is shown as including a tracking device 110 that interacts with one or both of NFC/RFID tag 120 and RFID tag 121 to verify the presence of the tag or tags. Tracking device 110 determines information regarding the device's location via one or both of a global positioning system 130 and wireless communications stations (e.g., using communications station 140 as part of a mobile telephone network). The tracking device 110 further interacts with a wireless communications system via communications station 140, for communicating information concerning one or both of location information for the tracking device 110, and the presence of one or both of the tags 120 and 121 within range of the tracking device 110.

The tracking device 110 can be implemented in a variety of manners to effect one or both of identification and location of the object 105. In addition, one or both of the tags 120 and 121 (or additional tags) may be implemented for verification of the proximity of the tracking device 110 and the RFID tag(s). These approaches may be carried out using, for example, one or more aspects as discussed above.

In some implementations, the NFC/RFID tag 120 is located in a portion of the object (e.g., a vehicle), and accordingly configured with a communications range that requires that the tracking device 110 be located in the vehicle in order to communicate with the tag. This approach facilitates the detection of the removal of the tracking device immediately, before the vehicle is moved. For example, if the tag 120 is a NFC tag limited to communications within a few centimeters, loss of NFC communications with the NFC tag 120 can be detected upon moving the tracking device away from the NFC tag by only a few centimeters. If the tracking device 110 is powered via an alternate source, such as a battery source, the device can thus communicate an alert regarding a failed communication with the RFID tag, immediately upon removal from the vehicle.

In some implementations in which the object is a vehicle, the system 100 further includes a vehicle communications circuit 150 that communicates with the tracking device 110 to receive information therefrom. The tracking device 110 communicates an alert signal to the vehicle communications system, in response to failing to verify the identity and presence of tag 120 (and/or tag 121). The vehicle communications system responds to the alert signal in one or more of a variety of manners, such as by disabling the vehicle. For example, if the tracking device 110 cannot verify the presence of the tag 120, an alert can be sent to the vehicle communications system 150, which facilitates disabling of the vehicle. This approach may involve, for example, sending a wireless communication from the object tracking device 110 to the vehicle communications system 150, in response to the object tracking device being removed from the vehicle (e.g., and thus out of range for communicating with the tag 120).

Figure 2:
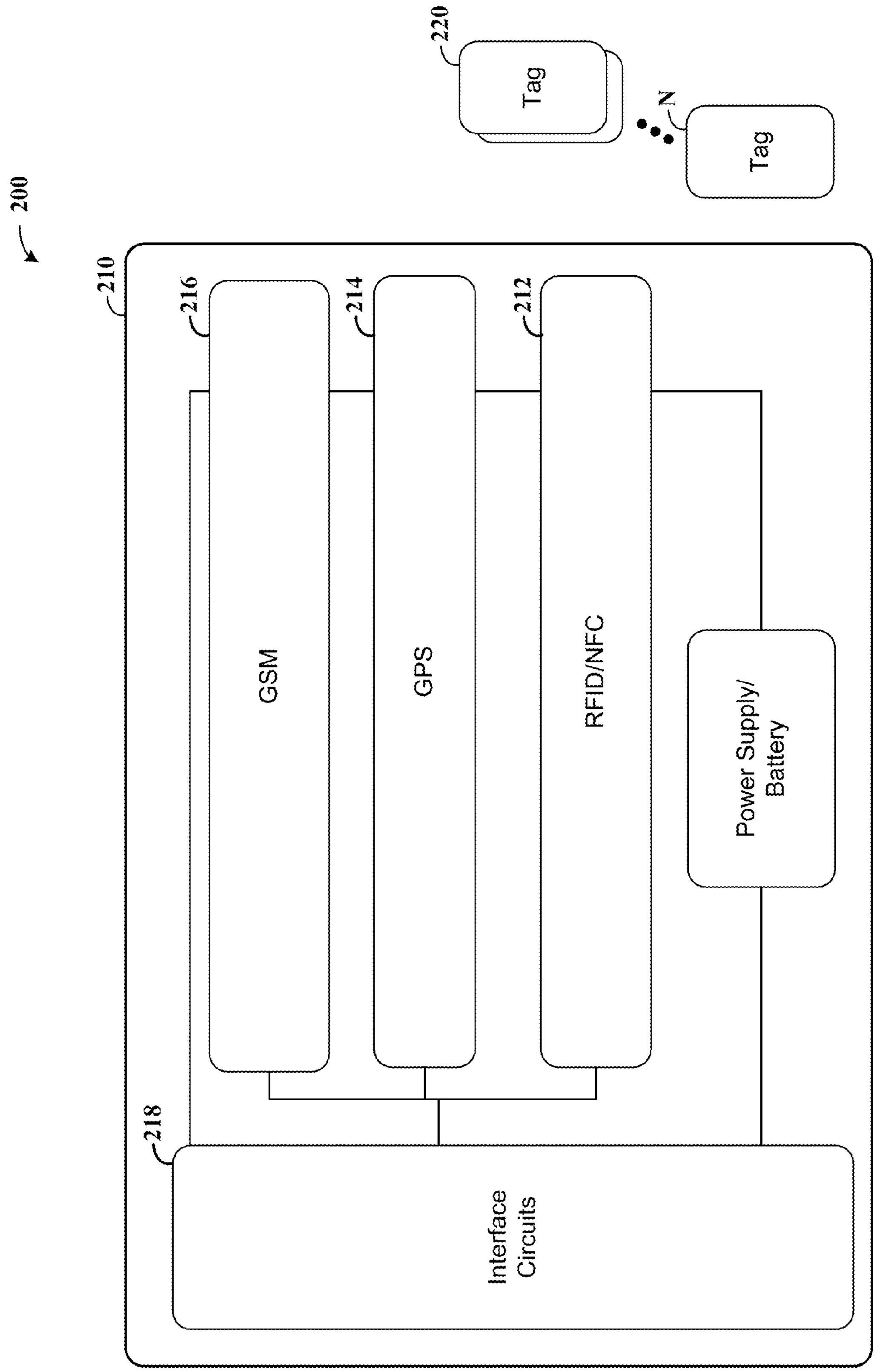
FIG. 2 shows a location-based tracking device, in accordance with another example embodiment of the present invention.

FIG. 2 shows a location-based tracking device 210, in accordance with another example embodiment of the present invention. The device 210 may, for example, be implemented in connection with the system 100 shown in FIG. 1, with tracking device 110. Such an application may, for example, be implemented in connection with vehicle tracking.

The tracking device 210 includes local tag reader (NFC/RFID) circuitry 212, GPS circuitry 214, and wireless communications (GSM) circuitry 216 for a GSM-based system. The device 210 may further include interface circuits 218, for communicating with circuits within an object (e.g., vehicle) in which the device 210 is employed. Local NFC and/or RFID communications with one or more tags 220-N are effected via the NFC/RFID circuitry 212. Positioning communications are effected via one or both of the GPS circuitry 214 and the GSM circuitry 216, and data communications are effected via the GSM circuitry.

Operation of the tracking device 210 may be carried out in accordance with one or more examples herein. In one embodiment, the NFC/RFID circuitry 212 verifies that the tracking device 210 is in the proximity of the tag(s) 220-N, for use in identification and tracking of an object with which the tracking device 210 is implemented. The tracking device 210 obtains positioning information via one or both of GPS and GSM circuitry 214 and 216, and communicates information over the GSM circuitry (e.g., via a station such as station 140 in FIG. 1) indicative of a characteristic of one or more of the tag(s) 220-N and position information. For instance, in one implementation, the tracking device 210 responds to a failure in establishing communications with tag 220 by sending an alert with positioning information via the GSM circuitry 214.

Figure 3:
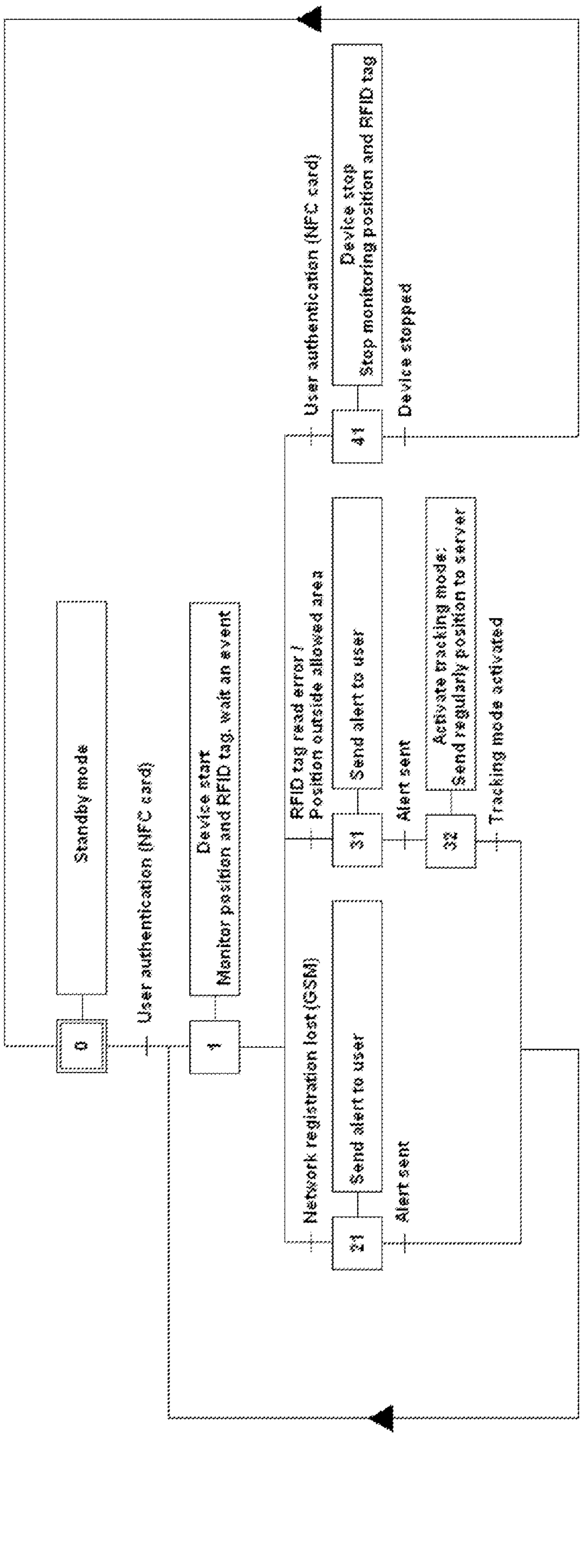
FIG. 3 shows a data flow diagram for location-based monitoring, in accordance with another example embodiment of the present invention.

FIG. 3 shows a data flow diagram for location-based monitoring, in accordance with another example embodiment of the present invention. The approach shown in FIG. 3 may be implemented, for example, in the system 100 as shown in FIG. 1 and/or using the tracking device 210 shown in FIG. 2. Starting from a standby mode at block 0, in response to a user authentication (e.g., detecting an NFC card), a device start is effected at block 1. Upon start-up, position and RFID tag presence are detected and a wait mode is entered. In the wait mode, the presence of the RFID tag is re-verified (e.g., at a polling interval), and position may be re-acquired as well. The detected location is verified as stationary within a defined area, and the detected RFID tag value is evaluated to ensure that it corresponds to a configured value (e.g., the proper RFID tag is sensed).

In response to the detection of one or more events such as those corresponding to blocks 21, 31 and 41, an event mode is entered. At block 21, an event is detected as a loss in wireless communication network registration (e.g., wireless registration with a GSM network), and an alert is sent if the registration is lost. This approach can be implemented with a communications system using the GSM network to verify registration of tracking devices, and can be regularly monitored. This approach may be implemented, for example, to detect an intentional jamming of wireless communications.

Referring to block 31, if the RFID tag cannot be read or has an invalid value, or if a location is detected as being outside of a defined area, the device sends an alert to a user over a wireless communication network (e.g., a GSM network) and enters a "tracking mode" at block 32. In this tracking mode, a current location is regularly sent to a server with the network, which can be carried out at a predefined interval (e.g., a user-defined interval). If the network becomes unavailable, the device stores location values in a batch file and sends the values to the server when it reconnects to the network.

Referring to block 41, monitoring is terminated in response to a user electing to stop the device. Such termination may be effected using, for example, an authentication card or code (e.g., a NFC card) to deactivate monitoring or tracking mode.

Based upon the above discussion and illustrations, those skilled in the art will readily recognize that various modifications and changes may be made to the present invention without strictly following the exemplary embodiments and applications illustrated and described herein. For example, various different types of distal-range communications, proximate-range communications and related devices can be used to implement various embodiments as discussed herein. Further, a variety of objects, such as different types of vehicles, animals or valuables, can be tracked/identified using approaches such as those discussed herein. Such modifications do not depart from the true spirit and scope of the present invention, including that set forth in the following claims. Furthermore, the term "example" as used throughout this document is by way of illustration, and not limitation.

The invention claimed is:

1. An object tracking apparatus comprising:

a proximate-range circuit configured to wirelessly communicate with at least one proximate-range communications device;

wherein at start-up of the object tracking apparatus, the proximate-range communications device is present and the proximate-range circuit enters a wait mode;

wherein in the proximate-range circuit remains in the wait mode if the proximate-range communications device is re-verified as present;

wherein in the proximate-range circuit enters a tracking mode if the proximate-range communications device is not present;

wherein in the proximate-range circuit provides an output indicative of an identification and the present or not present presence of the at least one proximate-range communications device;

a position-assessment circuit configured and arranged to assess current position information of the object tracking apparatus using received wireless communications, and to provide an output indicative of the position information;

a communications circuit coupled to receive the outputs from the proximate-range circuit and the position-assessment circuit, and configured to wirelessly communicate data including the position information via a distal-range communications station based upon the received outputs; and wherein in the communications circuit repeatedly transmits the current position to the distal-range communications station when the proximate-range circuit is in the tracking mode.

2. The apparatus of claim 1, wherein the communications circuit is configured to wirelessly communicate data via the distal-range communications station according to at least one of communicating data based upon the received outputs by communicating positioning information corresponding to the output from the position-assessment circuit, in response to the output from the proximate-range circuit being indicative of a failure to verify at least one of the presence and identification of the at least one proximate-range communications device, wirelessly communicating data indicating theft of an object connected to the object tracking apparatus, based upon the output of the proximate-range circuit indicating a lack of presence of a proximate-range communications device also connected to the object, and wirelessly communicating data indicating removal of an object connected to the object tracking apparatus from a predefined area, based upon the output of the proximate-range circuit indicating the lack of presence of one of the at least one proximate-range communications devices that is located in the predefined area.

3. The apparatus of claim 1, wherein the proximate-range circuit is configured to provide an output indicative of both the presence and identification of the at least one proximate-range communications device.

4. The apparatus of claim 1, wherein the proximate-range circuit is configured to wirelessly communicate with at least one proximate-range communications device to verify the identification and presence of the at least one proximate-range communications device on a repeated cycle and to provide an output indicating that the at least one proximate-range communications device is no longer proximally located in response to failing to detect the presence of the at least one proximate-range communications device at one of the repeated cycles.

5. The apparatus of claim 1, wherein the object tracking apparatus includes a memory circuit configured to store data corresponding to a device identification of one of the at least one proximate-range communications devices, and the communications circuit is configured to wirelessly communicate the stored data to a user via the remote communications station for the device identification.

6. The apparatus of claim 1, wherein the object tracking apparatus is configured to generate and communicate an output to disable a vehicle to which the object tracking apparatus is connected, in response to at least one of the output of the proximate-range circuit indicating that the at least one proximate-range communications device is no longer within communications range in response to failing to detect the presence of the at least one proximate-range communications device, the output of the position-assessment circuit indicating a change in position of the vehicle, and the communications circuit failing to register with a network via the distal-range communications station.

7. The apparatus of claim 1, wherein the object tracking apparatus is configured to respond to a user input by authenticating the user input and, in response thereto, deactivating at least one of the respective generation of the outputs and the wireless communication of data to the distal-range communications station.

8. The apparatus of claim 1, wherein the proximate-range circuit is configured to provide an output indicative of the presence of the at least one proximate-range communications device by providing an output indicative of the removal of the object tracking apparatus from a predefined area, based upon the output of the proximate-range circuit indicating the lack of presence of one of the at least one proximate-range communications devices that is located in the predefined area, and the positioning circuit is configured to initiate a tracking mode and determine the positioning information of the object tracking apparatus in response to the output of the proximate-range circuit indicating that the object tracking apparatus has left the predefined area.

9. The apparatus of claim 1, wherein the positioning circuit includes at least one of the communications circuit, wherein the communications circuit is configured to detect a position of the object-tracking apparatus based upon signals received via the distal-range communications station over a common wireless link via which communications are effected, and a global positioning circuit configured to receive signals from global positioning satellites and to detect a position based upon the received global positioning signals.

10. A system for tracking an object, the system comprising:

a proximate-range communications tag configured to respond to proximate-range wireless communications by wirelessly communicating identification information; and an object-tracking device configured and arranged to enter a wait mode at start-up when the proximate-range communications tag is present;

remain in the wait mode if the proximate-range communications tag is re-verified as present;

enter a tracking mode if the proximate-range communications tag is not present;

determine a current geographical position of the object-tracking device using received wireless communications, and wirelessly communicate data indicative of the determined geographical position via a distal-range communications station, based on the verification of an identity and the present or not present presence of the tag; and repeatedly transmitting the current geographical position to the distal-range communications station while in the tracking mode.

11. The system of claim 10, wherein the object tracking device is configured to respond to failing to verify the identity and the presence of the tag by wirelessly communicating data indicative of the determined geographical position and failed tag verification.

12. The system of claim 10, wherein the object tracking device is connected to a vehicle, the tag is connected to a portion of the vehicle that is remote from the object tracking device, and the object tracking device is configured to wirelessly communicate data indicative of the determined geographical position via the distal-range communications station by communicating an alert indicative of the object tracking device being removed from the vehicle in response to the object tracking device failing to verify the presence and identification of the tag.

13. The system of claim 10, wherein the object tracking device is connected to a vehicle, the tag is connected to an external structure at a predefined location in which the vehicle can be located, and the object tracking device is configured to wirelessly communicate data indicative of the determined geographical position via the distal-range communications station by communicating data indicating that the vehicle is in the predefined location in response to verifying the presence and identity of the tag, and by communicating data indicating that the vehicle is not in the predefined location in response to failing to verify the presence and the identity of the tag.

14. The system of claim 10, wherein the object tracking device is connected to a vehicle, wherein the tag is a local tag connected to a portion of the vehicle that is remote from the object tracking device, further including a remote RFID tag connected to an external structure at a predefined location in which the vehicle can be located, and wherein the object tracking device is configured to wirelessly communicate data indicative of the determined geographical position via the distal-range communications station by communicating an alert indicative of the object tracking device being removed from the vehicle in response to the object tracking device failing to verify the presence and the identity of the local tag, and communicating data indicating that the vehicle is in the predefined location in response to verifying the presence and the identify of the remote RFID tag, and by communicating data indicating that the vehicle is not in the predefined location in response to failing to verify the presence and the identity of the remote RFID tag.

15. A method for tracking an object, the method comprising:

wirelessly communicating with at least one proximate-range communications device;

entering a wait mode at start-up when the proximate-range communications device is present;

remaining in the wait mode if the proximate-range communications device is re-verified as present;

entering a tracking mode if the proximate-range communications device is not present;

providing an output indicative of the present or not present presence of the at least one proximate-range communications device;

determining current geographical positioning information using received wireless communications, and providing an output indicative of the determined positioning information;

wirelessly communicating data including the determined positioning information via a distal-range communications station, based upon the provided outputs; and repeatedly transmitting the current positioning information to the distal-range communications station while in the tracking mode.

* * * * *